Figure 1:
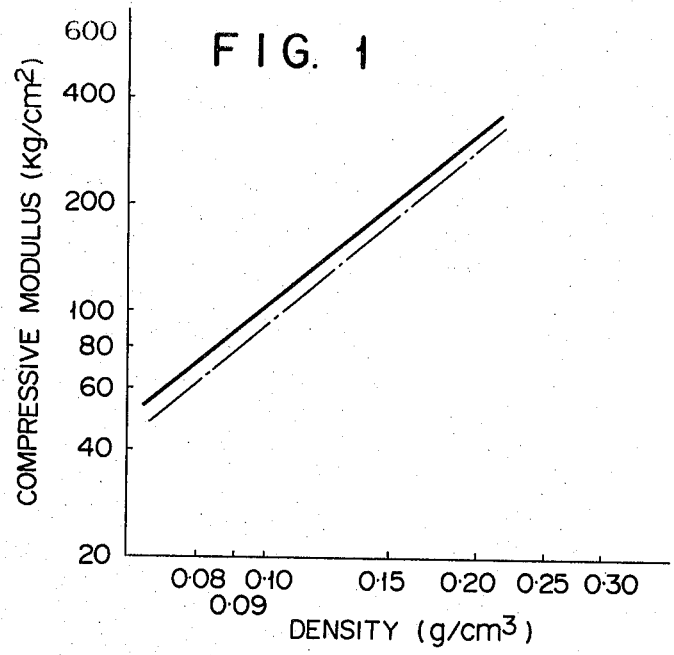

United States Patent [19]

Kasai et al.

[11] 3,863,000

[45] Jan. 28, 1975

[54] METHOD OF MANUFACTURING A TOUGH THERMOPLASTIC RESIN FOAM

[75] Inventors: Akira Kasai, Fujisawa; Mitsuo Inui; Nobuo Hoshino; Kenichi Hattori, all of Yokohama; Naonori Shiina, Tokyo; Hiroyuki Nakae, Yokohama, all of Japan

[73] Assignee: The Furukawa Electric Co., Ltd., Tokyo, Japan

[22] Filed: Oct. 18, 1972

[21] Appl. No.: 298,781

[30] Foreign Application Priority Data
Oct. 23, 1971  Japan.............................. 46-84135

[52] U.S. Cl.................... 264/45.5, 264/48, 264/53, 264/237, 264/348, 264/DIG. 13, 264/DIG. 14, 264/45.9
[51] Int. Cl.......................................... B29d 27/100
[58] Field of Search... 264/348, 47, 48, 53, DIG 13, 264/DIG. 14, 237

[56] References Cited
UNITED STATES PATENTS

| | | | |
|---|---|---|---|
| 3,299,192 | 1/1967 | Lux...................................... | 264/237 |
| 3,411,967 | 11/1968 | Rowland et al.............. | 264/DIG. 13 |
| 3,560,600 | 2/1971 | Gliniecki............................... | 264/48 |
| 3,666,162 | 5/1972 | Tiffin et al........................... | 264/48 |

*Primary Examiner*—V. P. Hoke
*Attorney, Agent, or Firm*—Kemon, Palmer & Estabrook

[57] ABSTRACT

A method of manufacturing a tough thermoplastic resin foam having a low density and large cell size which comprises extruding a mixture of a thermoplastic resin and foaming agent through an extruder at temperatures slightly higher than the softening point of the mixture to create foam nuclei, and thereafter slowly cooling the extruded mixture to make the foam nuclei grow and form cells more than 5 mm in diameter.

15 Claims, 2 Drawing Figures

METHOD OF MANUFACTURING A TOUGH THERMOPLASTIC RESIN FOAM

This invention relates to a method of manufacturing from thermoplastic resin a foam of low density and great mechanical strength, particularly compressive strength.

Further, the method of this invention consists is extruding into a board a resin composition prepared by dissolving a volatile foaming agent in thermoplastic resin at temperatures slightly higher than softening or melting point of said composition using an extruder and flat die; prior to the formation of foam nuclei, quenching only the top and bottom surfaces of the extruded board to render them as hard as desired; and thereafter effecting slow cooling to cause foam cells to be grown in the direction of the thickness of the board, namely, to make the cells prominently longer in the lateral axial direction than in the longitudinal axial direction, thereby providing a foamed body of great compressive strength and bending strength.

A foam manufactured from thermoplastic resin by the conventional method is a soft mass generally formed of fine cells having a density of about 0.03 g/cm³, and presents prominent heat-insulating and shock-absorbing properties, but has an extremely small mechanical strength.

In this connection, there may be cited the U.S. Pat. No. 3,523,988 as a method of manufacturing a foam of great mechanical strength in order to attain improvements in the aforesaid drawbacks accompanying the foam of prior art.

According to the method of said U.S. patent, the die includes an expansion chamber to reduce pressure therein. In a die slit next to said expansion chamber, there is foamed a mixture of polyolefin, volatile foaming agent and nucleating agent. Compression is applied to collapse the cells on the surfaces of the foam so as to produce a hard skin. The foam is fully expanded in said expansion chamber under a certain pressure. The method of said United States patent differs from this invention in that the foam is expanded while it is subjected to a shearing stress in a confined zone. Accordingly, the foam obtained by the U.S. patent method consists of cells less then 5 mm in diameter and has a density of 0.16 g/cm³ at the lowest, and a thickness of less than 10 mm.

In contrast, the manufacturing method of this invention is characterized by extruding a mixture of a thermoplastic resin and a volatile foaming agent in a dissolved state through a die into the atmospheric to create foam nuclei and thereafter slowly cooling the extruded mixture to cause cells to be finally grown. According to this invention, cells can be fully grown, because foam nuclei are gradually grown under atmospheric pressure in a state free from any shearing stress, thus making is easily possible to manufacture a foamed board, about 10 mm in cell diameter (herein defined to mean an average of diameters measured in the three dimensional directions of the individual cells), 0.1 g/cm³ in density and 50 mm in thickness. The foam of this invention, therefore, generally includes cells defined by thick walls and strands, presenting a prominently great compressive strength.

Figure 2:
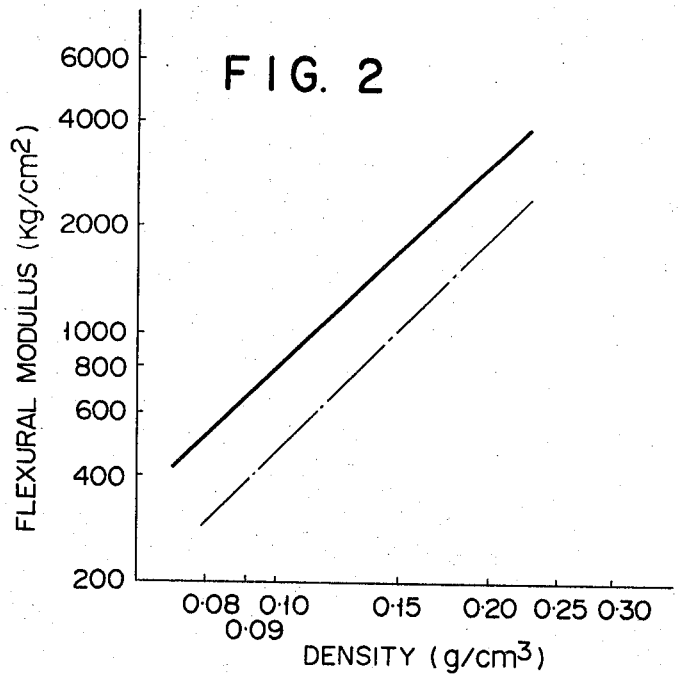

This invention can be more fully understood from the following detailed description when taken in connection with reference to the accompanying drawing, in which:

FIG. 1 is a line diagram showing the relationship of the density and compressive modulus of foamed bodies obtained in the examples of this invention; and FIG. 2 is a line diagram showing the relationship of the density and flexural modulus of foamed bodies obtained in the examples of the invention.

As apparent from the above description, a foamed body manufactured by the method of this invention contains extremely large cells. Though not theoretically clearly defined yet, the mechanism in which a foam having such large cells is produced is thought, from the experiments made by the present inventors, to be that when a volatile foaming agent was gasified very slowly under a condition substantially free from a shearing stress, then foam nuclei were created in a relatively small number, thus resulting in the growth of large cells.

The following are requirements for formation of large cells by slow gasification of the volatile foaming agent:

1. to carry out extrusion with the thermoplastic resin and volatile foaming agent kept in a dissolved state;
2. to extrude and expand the resin mixture at as low temperatures as possible; and
3. to effect expansion continuously for a long time under a condition substantially free from a shearing stress.

Production of a plastic foam containing cells more than 5 mm in diameter can be attained only when the above-mentioned requirements are satisfied. As used herein, the term "foam cells having a diameter of more than 5 mm" is defined to mean that the volume occupied by cells having a diameter of more than 5 mm accounts for more than 50 percent based on an entire volume of a foamed body. When the mixture of the resin and volatile foaming agent in a dissolved state is extruded at relatively low temperature into the atmosphere, said foaming agent becoms supersaturated in the resin. The supersaturated foaming agent gathers in the nonhomogeneous portion of the mixture, for example, the portion where there is a nucleating agent, thus giving rise to the creation of foam nuclei.

Foam cells tend to grow owing to the vapour pressure of the foaming agent prevailing at the temperature used. However, said growth is obstructed by the viscoelasticity of the thermoplastic resin. The growing speed of foam cells, therefore, is defined by the degree of supersaturation and vapour pressure of the volatile foaming agent and the viscoelasticity of the thermoplastic resin. This invention enables a foam having large cells to be produced by controlling these factors to attain the proper growing speed of cells.

Growth of foam cells is supposed to terminate at a point at which the vapour pressure of the volatile foaming agent and the viscoelasticity of the thermoplastic resin fully balance each other. If cooling is carried out too quickly, the growth of cells will cease before they are fully formed, causing them to be reduced in size, and in consequence failing to provide a foam of low density and appreciable thickness. Conversely, if cooling is effected too slowly, the growth of cells will be carried to excess, giving rise to the occurrence of voids within the foam.

The thermoplastic resins used in the method of this invention include polyolefins, copolymers of olefins, polystyrene, copolymers of styrene, polyvinyl chloride, copolymers of vinyl chloride, acrylic resin, polyamide, polyester, polyacetal and polycarbonate. Preferable among these thermoplastic resins are polyolefins and copolymers of olefins. Particularly desirable is high density polyethylene having a melt index (M.I.) of less than 1.0. Though the reason is not fully understood, this high density polyethylene facilitates the growth of foam cells with thick walls and strands, thereby enabling a desired foam to be manufactured stably.

The volatile foaming agents used in the method of this invention include hydrocarbons, halogenated hydrocarbons, alcohols, ethers, esters and mixtures thereof each having a boiling point lower than the softening point of the thermoplastic resin used. Preferable are hydrocarbons and halogenated hydrocarbons having a boiling point ranging from −20°C to 50°C. Particularly preferable is trichloromonofluoromethane. This is supposed to be fothe reason that said material has a prominent solubility in the thermoplastic resin in the extruder and presents a sharp decrease in solubility when the pressure and temperature fall after extrusion. While amount of the volatile foaming agent added to the thermoplastic resin varies with kind, the amount of said foaming agent is generally chosen to be 2 to 20 parts by weight or preferably 6 to 15 parts by weight based on 100 parts by weight of the thermoplastic resin. If too much foaming agent is added, then there will grow a large number of foam nuclei in the die. As a result, when the resin mixture is extruded into the open air, there will appear fine cells in the foam, suppressing any further growth of cells. Further, part of the foaming agent will be lost by escaping through the cell wall, failing to provide large cells and in consequence a thick foam.

Conversely, if the amount of the foaming agent is too small, then the growth of foam nuclei will decrease, leading to a failure to produce desired cells, and in consequence a thick foam of high density. When a foaming agent suitable for the thermoplastic resin used is added in the above-mentioned proportions, it is required that there be formed no or few visible foam nuclei in the die. If, otherwise, numerous foam nuclei are formed, there will not be obtained a foam having large cells. The extrusion temperature applied in the method of this invention is generally between the softening or melting point of a resin mixture and a temperature 20°C higher than the softening or melting point of the resin itself. If extrusion is carried out at too high temperature, then the foaming agent will present an unduly high vapour pressure, and the viscoelasticity of the thermoplastic resin will be excessively low. When, therefore, the resin mixture is extruded through a die into the open air, the foaming agent will change into numerous fine bubbles which partly escape through the mixture without forming cells therein, failing to provide a mechanically strong foam having large cells.

Since the foaming agent used in the present invention is soluble in the thermoplastic resin, the softening or melting point of the resin mixture is considerably below that of the resin itself. Therefore, if extrusion is attempted at temperatures lower than the softening or melting point of the resin mixture, then extrusion will substantially fail.

In the method of this invention, slow cooling of the extruded resin mixture is done long enough to attain a desired growth of cells, generally 2 to 25 minutes.

Slow cooling is customarily carried out by allowing the extruded mixture to stand in the air, blowing air onto it, placing it in a heat transfer medium such as water or other liquid at higher temperature than room temperature, or, placing it in contact with a metal plate or in a mold, each having a required temperature.

While, for the method of this invention, the extruded mixture should be cooled very slowly for the growth of foam nuclei, the fully expanded foam may be cooled rapidly. Further, the expansion may be effected under reduced pressure, insofar as the speed of expansion is not unduly accelerated.

For the method of this invention, it is important to form and grow a relatively small amount of foam nuclei and it is therefore desirable to use a small amount of a nucleating agent. The nucleating agent may consist of inorganic materials such as calcium carbonate, clay, talc, zinc white, silicate and glass powders or organic materials such as carbon black, and wooden powers. The amount of the nucleating agent is preferably less than 3 parts by weight, or most preferably 0.1 to 1.5 parts by weight on the basis of 100 parts by weight of the thermoplastic resin used. Absence of the nucleating agent will tend to result in the uneven sparse distribution of cells. Conversely, excess addition of the nucleating agent will lead to the excessive formation of foam nuclei and in consequence the occurrence of fine cells, failing to provide a desired mechanically strong foam having large cells.

In the method of this invention, it is desirable to make foam nuclei grow under a condition substantially free from a shearing stress. Accordingly, there is not used a process of producing foam nuclei in the head of an extruder and extruding the resin mixture while expanding it.

Since the method of this invention comprises slowly cooling the extruded mixture for its tardy expansion, it is taken up from a die at a lower speed than an extrusion speed at a die, thereby effecting expansion under a condition substantially free from a shearing stress. A preferable process of this invention which enables the resin mixture to be expanded under a condition free from a shearing stress is to subject the extruded mixture to die swelling and effect its expansion with the cross sectional shape of said die swollen mass kept unchanged. If, otherwise, the extruded resin mixture is drawn from the die faster than it runs through the die and thereafter expanded, then numerous fine cells will tend to form in the resin, failing to provide the foam of this invention having excellent physical properties. The reason why the foam of this invention presents great mechanical strength, particularly prominent compressive strength is that it has the large cells, therefore, thick walls and strands.

Another reason is that when foam cells are grown, the cell walls and strands are stretched for orientation.

In the prior art foam, the cell wall and the strands have a considerably uniform thickness of 1 to 10 microns. In the foam of this invention, however, the thickness extends over a wide range of 10 to 2,000 microns.

This invention enables a resin mixture to be extruded into rods, pipes and boards which are all characterized by the great thickness. According to the invention, there can be obtained a foam generally having a thickness of 10 to 200 mm, or preferably 20 to 100 mm. A foam having a thickness of less than 10 mm can not have large cells with a low density. If said thickness exceeds 200 mm, then there will appear large voids in the center of the foam, failing to make it mechanically strong.

The foam prepared by this invention is characterized in that it has great mechanical strength and low density generally ranging between 0.05 to 0.3 g/cm$^3$, preferably between 0.08 and 0.20 g/cm$^3$.

Another embodiment of this invention consists of extruding the resin mixture of a thermoplastic resin and a volatile foaming agent in the form of a board through a die orifice at a temperature slightly higher than the softening temperature of mixture, cooling the surfaces of the board rapidly to form skin layers on both sides thereof, and cooling the board with skin layers slowly to cause the formation of foam nuclei therein to make cells grow more than 5 mm in average cell diameter. Formation of skins on both surfaces of the extruded board prevents its expansion in the extruding direction and lateral direction, with the result that foam nuclei are grown substantially in the direction of the thickness of the extruded board, thus providing a thick board formed of Rugby ball-like cells. The above-mentioned process facilitates the formation of skins about 1 mm thick. A foam bearing such skins noticeably increases in not only compressive strength but also bending strength.

Rapid cooling of both surfaces of the extruded board may be effected by blowing cold gas, for example, cold air into the board, spraying liquid such as water thereon, placing it into contact with cooled metal material such as a metal roll or plate, or fixing it to a sheet-like material such as metal plate, gypsum board and woven glass fabric.

The foam manufacturing method of this invention permits the resin mixture to be incorporated with various additives such as an antioxidant, ultraviolet absorber, flame retardant and pigments.

The thermoplastic foam prepared by this invention can be easily fabricated into a desired article through the undermentioned steps. Foams, particularly foamed boards can be bonded together by filling a hotmelt adhesive into large cells appearing on the joining surfaces of said boards, melting said adhesive and thereafter pressing the joining surfaces against each other.

Where two boards are bonded in an L-shape, the outer angular periphery of the L-shape defined by part of one side of the two boards and the inner angular periphery of the L-shape defined by part of the opposite side of the boards are fitted with similar L-shaped metal patches, one of which is coated with a hotmelt adhesive on the inside and the other of which is coated with said adhesive on the outside. Heat is applied from the exposed sides of said metal patches to join the two boards by thermal fusion and bond the metal patches to the outer and inner angular peripheries of the L-shape joined two boards.

When a single board is bent, there is formed a V-shaped notch in that portion of the surface of the board where it is to be bent; the inner surface of the V-shaped notch is coated with an adhesive; the board is bent at the center of said V-shaped notch; the mutually facing surfaces of the V-shaped notch are pressed against each other to be bonded together by means of the adhesive at any desired angle corresponding to that of said V-shaped notch.

The flattening or embossing of the surface of a foam board may be effected, for example, by moving the surface over a heated metal roll or plate while pressing said surface tightly against it.

Further, a foam particularly a foam, board, may be rendered selfextinguishable by cutting off its surface skins to expose large cells and filling them with a nonflammable or flame retarding agent.

The foam of this invention has prominent resistance to not only compression and bending but also chemicals and frigidity. Moreover, said foam has decidedly more excellent heat insulating and shock absorbing properties than wooden or other hard boards, though slightly inferior in these respects to a foam bearing fine cells. Accordingly, the foam of this invention can be used in a considerably wide field of application, such as antifreezing materials for railways and roads, scaffold boards, civil engineering materials such as concrete forming plates, structural materials such as the floors, walls and roof heat insulating members of building, heat insulating materials of refrigerated warehouses, packing materials used in a container in which heavy articles are transported, pallets and noise absorbing materials.

This invention will be more fully understood from the examples which follow.

EXAMPLE 1

An extruder 80 mm in diameter was charged with a mixture of 100 parts by weight of high density polyethylene having a melt index of 0.2, a density of 0.96 g/cm$^3$ and a melting point of 134°C and 1 part by weight of calcium carbonate as a nucleating agent. While the mixture was passing through the extruder, there was added to said mixture a volatile foaming agent of trichlorofluoromethane in various amounts indicated in Table 1 below. Said mixture was extruded through a flat die 400 mm wide and 3 mm thick and taken up at various speeds shown in Table 1.

Table 1

| Item | Sample No. | | | | | |
|---|---|---|---|---|---|---|
| | 1 | 2 | 3 | 4 | 5 | 6 |
| Trichlorofluoromethane (parts by weight) | 8.2 | 9.0 | 10.4 | 11.8 | 13.2 | 15.0 |
| Approximate extrusion speed (cm/min.) | 30 | 30 | 30 | 30 | 30 | 30 |
| Take up speed (cm/min.) | 10.0 | 10.5 | 11.0 | 12.0 | 12.5 | 13.0 |
| Time required for full growth of cells (min.) | 13.0 | 13.0 | 13.5 | 14.0 | 14.5 | 15.0 |
| Thickness of foam (mm) | 55 | 56 | 58 | 60 | 62 | 64 |
| Width of foam (mm) | 410 | 410 | 415 | 420 | 425 | 430 |

Table 1—Continued

| Item | Sample No. | | | | | |
|---|---|---|---|---|---|---|
| | 1 | 2 | 3 | 4 | 5 | 6 |
| Density of foam (g/cm³) | 0.19 | 0.16 | 0.12 | 0.10 | 0.08 | 0.06 |
| Percentage volume occupied by cells more than 5 mm in diameter (%) | 95 | 95 | 95 | 95 | 95 | 95 |
| Compressive modulus (kg/cm²) | 290 | 180 | 110 | 90 | 64 | 38 |
| Flexural modulus (kg/cm²) | 1800 | 1100 | 600 | 450 | 300 | 180 |

The temperature of the mixture was 142°C. The mixture extruded through the flat die was slowly cooled by blowing air (30°C) thereon. Foam nuclei began to be formed in the mixture at a point about 1 cm from the die outlet and cells began to appear at a point about 5 cm therefrom. When the mixture was taken up about 160 cm from the die outlet, the growth of cells was completed. The foam obtained consisted of cells, most of which had a diameter of more than 5 mm. The thickness, width density, compressive and flexural modulus of the foam obtained, the size of cells are all presented in Table 1 with respect to samples Nos. 1 to 6. The relationship of the density and compressive modulus of the foam is indicated in a dot-dash line in FIG. 1 and the relationship of the density and flexural modulus thereof in a dot-dash line in FIG. 2. As apparent from Table 1 above, the method of this invention provides a light, thick foam of great compressive strength.

Experiments for comparison

A. Where, in the above Example 1, the temperature of the mixture changed to 160°C, then foam nuclei were formed in the mixture in the die. Therefore, even when the extruded mixture was slowly cooled in the open air, there were not grown large cells. Most of the cells formed had a diameter of less than 5 mm.

B. Where, in Example 1, amount of trichlorofluorethane as a foaming agent was increased to 30 parts by weight, then there were produced numerous cells in the mixture in the die. At the time of extrusion, the cells instantly expanded. But, said expansion was restricted to a certain extent, so that the foam obtained consisted of cells mostly less than 2 mm in diameter, and consequently was rendered soft.

C. The resin mixture extruded under the same condition as described in Example 1 was quenched in the water at 15°C held in a tank. Within one minute thereafter, the growth of cells therein stopped. The foam obtained consisted of sparsely distributed cells mostly less than 5 mm in diameter, a density of 0.64 g/cm³.

D. The resin mixture was extruded under substantially the same condition as described in Example 1 excepting that the take up speed was increased to 50 cm/min. Though, at this time, there were suddenly created numerous foam nuclei, yet cells were grown only in small amounts. The foam obtained consisted of cells mostly less than 5 mm in diameter.

The foams other than those prepared under the condition shown in Table 1 above proved to be outside of the object of this invention.

EXAMPLE 2

The same extruder 80 mm in diameter as used in Example 1 was charged with a mixture of 100 parts by weight of high density polyethylene having a melt index of 0.2, a density of 0.96 g/cm³ and melting point of 134°C and 1 part by weight of calcium carbonate as a nucleating agent. While the mixture was passing through the extruder there was added to the mixture a volatile foaming agent of trichlorofluoromethane in various amounts indicated in Table 2 below. The resin mixture was extruded through a flat die 400 mm wide and 3 mm thick and taken up at various speeds indicated in Table 2.

Table 2

| Item | Sample No. | | | | | |
|---|---|---|---|---|---|---|
| | 1 | 2 | 3 | 4 | 5 | 6 |
| Trichlorofluoromethane (parts by weight) | 7.0 | 8.2 | 9.0 | 10.4 | 11.8 | 13.2 |
| Extrusion speed (cm/min. approximate) | 30 | 30 | 30 | 30 | 30 | 30 |
| Take up speed (cm/min.) | 10.0 | 10.5 | 11.0 | 12.0 | 12.5 | 13.0 |
| Time required for full growth of cells (min.) | 10.5 | 11.0 | 11.5 | 12.0 | 12.5 | 13.0 |
| Thickness of foam (mm) | 45 | 46 | 48 | 50 | 52 | 54 |
| Width of foam (mm) | 370 | 370 | 375 | 380 | 385 | 390 |
| Thickness of skin (mm) | 0.5 | 0.5 | 0.5 | 0.5 | 0.5 | 0.5 |
| Density of foam (g/cm³) | 0.19 | 0.16 | 0.12 | 0.10 | 0.08 | 0.06 |

Table 2—Continued

| Item | Sample No. | | | | | |
|---|---|---|---|---|---|---|
| | 1 | 2 | 3 | 4 | 5 | 6 |
| Percentage volume occupied by cells more than 5 mm in diameter | 95 | 95 | 95 | 95 | 95 | 95 |
| Percentage volume occupied by cells having a size of a/b*> 1.5 | 95< | 95< | 95< | 95< | 95< | 95< |
| Compressive modulus (kg/cm²) | 300 | 200 | 130 | 100 | 70 | 50 |
| Flexural modulus (kg/cm²) | 2800 | 1800 | 1000 | 800 | 500 | 350 |

* a represents the length of a cell in the direction of the thickness of a foamed board and b the length thereof in a direction perpendicular thereto.
The temperature of the resin mixture was 142°C.

The resin mixture extruded through the flat die was contacted by a copper pipe 20 mm in diameter disposed at the die outlet and cooled to 150°C so as to have only both surfaces cooled rapidly for the formation of skins. Foam nuclei began to be formed when the extruded mixture reached 1 cm from the die outlet and cells commenced growth when said extruded mixture further travelled about 3 to 4 cm from the die outlet. The cells grew only in the direction of the thickness of the board obtained. Thereafter the board was cooled in the open air at 30°C. The growth of cells terminated when the board moved about 150 cm from die outlet. The board obtained consisted of Rugby ball-like cells, most of which had a diameter of more than 5 mm, extending in the direction of the thickness of the board.

Measurement was made of the thickness, width, sking thickness, density, compressive modulus and flexural modulus of various board samples Nos. 1 to 6 obtained, the shape and size of cells, the results being presented in Table 2 above.

The relationship of the density and compressive modulus of the board obtained is shown in a solid line in FIG. 1 and the relationship of the density and flexural modulus thereof similarly in a solid line in FIG. 2. As apparent from Table 2 above, this invention produces a light, thick foam of prominent compressive and bending strength.

EXAMPLE 3

An extruder 65 mm in diameter was charged with a mixture of 100 parts by weight of ethylene-butenecopolymer having a melt index of 0.3 and density of 0.95 g/cm³ and 1 part by weight of clay. While the mixture was passing through the extruder, there was added thereto 8 parts by weight of trichlorofluoromethane. The resin mixture was extruded through a rod-shaped die 20 mm in diameter.

The temperature of the resin mixture was 140°C. The resin mixture extruded from the rod-shaped die was immediately cut to a proper length and put into a buoy-mold 150 mm long, 80 mm wide and 20 mm thick. It was held for about 15 minutes in this mold left in the air while pressure was applied from the outside. After fully cooled with water at 20°C, the mold was opened to take out the buoy. The buoy obtained had a skin 0.4 mm thick and a density of 0.16 g/cm³. The volume occupied by cells having a diameter of more than 5 mm accounted for 90 percent of the entire volume of the buoy. The buoy was light and had as great compressive strength as 25 kg/cm².

EXAMPLE 4

An extruder 65 mm in diameter was charged with a mixture of 100 parts by weight of crystalline polypropylene having an M.F.I value of 0.3 and a density of 0.90 g/cm³ and 1 part by weight of calcium carbonate. While the mixture was passing through the extruder, 12 parts by weight of trichlorofluoromethane was added to the mixture. The resin mixture was extruded through a flat die 240 mm wide and 2 mm thick. The temperature of the resin mixture was 170°C. The resin mixture was extruded at a speed of 30 cm/min. and taken up from the die at a speed of 20 cm/min. The extruded mixture delivered from the die was made to contact with a copper pipe 20 mm in diameter disposed at the die outlet and kept at a temperature of 15°C to cool rapidly both surfaces of the foam obtained, thereby forming skins thereon. When the extruded mixture reached 0.5 cm from the die outlet, there were created foam nuclei and when it travelled about 3 cm from the die outlet, cells commenced growth, which continued in the direction of the thickness of the foaming board. The foaming board was cooled at 30°C. The growth of cells was brought to an end when the foaming board moved about 60 cm from the die outlet. The entire extruding cycle took 3 minutes. The foamed board obtained was 20 mm thick, 180 mm wide and 0.11 g/cm³ in density with skins 0.5 mm thick. The volume occupied by cells more than 5 mm in diameter accounted for 80 percent of the entire volume of the foamed board. Further, the volume of cells having a size of a/b > 1.5 (a and b as previously defined) indicated 85 percent of the foamed board, most of which consisted of Rugby ball-like cells extending in the direction of the thickness. Thus there was obtained a foamed board having prominent physical properties, as compressive modulus of 150 kg/cm² and flexural modulus of 1300 kg/cm².

EXAMPLE 5

An extruder 80 mm in diameter was charged with a mixture of 100 parts by weight of polystyrene and 0.5 part by weight of zinc white. While the mixture was passing through the extruder, 10 parts by weight of butane was added to it. The resin mixture was extruded through a flat die 400 mm wide and 2 mm thick. The temperature of the mixture was 155°C. The resin mixture travelled through the extruder at a speed of 30 cm/min. and was taken up from the die outlet at a speed of 15 cm/min. The extruded mixture delivered from the die was made to contact with a copper pipe 20 mm in diameter disposed at the die outlet and kept at a temperature of 15°C to cool rapidly both sides of the extruded board obtained, thereby forming skins thereon. When the board reached 1 cm from the die outlet, there were formed foam nuclei, and when the board travelled about 3 cm from the die outlet, cells commenced growth, which continued in the direction of the thickness of the board. The foaming board was cooled at 30°C. The growth of cells was terminated when the foaming board travelled about 50 cm from the die outlet. The entire extruding cycle took about 3 minutes. The foamed board obtained was 30 mm thick, 390 mm wide and 0.13 g/cm² with skins 0.6 mm thick. The volume occupied by cells more than 5 mm in diameter accounted for 90 percent of the entire volume of foamed board. Further, the volume of cells having a size of $a/b > 1.5$ ($a$ and $b$ as previously defined) indicated 90 percent of the foamed board, most of which consisted of Rugby ball-like cells extending in the direction of the thickness. Thus there was produced a foamed board having excellent physical properties, as compressive modulus of 250 kg/cm² and flexural modulus of 2,000 kg/cm².

What we claim is:

1. A method of manufacturing a tough thermoplastic resin foam having a low density and large cell size which comprises
   a. introducing into an extruder a thermoplastic resin, 2 to 20 parts by weight of a volatile foaming agent based on 100 parts by weight of said resin and soluble in said resin at extruding temperature and less than 3 parts by weight of a nucleating agent based on 100 parts by weight of said resin,
   b. extruding into the atmosphere the mixture through a die orifice at a temperature between the softening or melting point of said mixture and a temperature 20°C higher than the softening or melting point of the thermoplastic resin itself, and
   c. cooling slowly the extruded mixture to cause the formation of foam nuclei therein and to make cells grow more than 5 mm in average cell diameter by permitting the extruded mixture to stand in the open air or placing it in a heat transfer medium, while taking up the extruded mixture at a speed less than the extrusion speed at the die orifice.

2. A method according to claim 1 wherein said cooling is carried out at such a rate that the growth of cells is completed in 2 to 25 minutes after the extrusion of said mixture.

3. A method according to claim 1 wherein the thermoplastic resin is one selected from the group consisting of polyolefins, copolymers of olefins, polystyrene, copolymers of styrene, polyvinyl chloride, copolymers of vinyl chloride, acrylic resin, polyamide, polyester, polyacetal and polycarbonate.

4. A method according to claim 3 wherein the polyolefin is one selected from the group consisting of polyethylene, polypropylene, polybutene and copolymers thereof.

5. A method according to claim 4 wherein the polyethylene is high density polyethylene having a melt index of less than 1.

6. A method according to claim 1 wherein the volatile foaming agent is one selected from the group consisting of hydrocarbons, halogenated hydrocarbons, alcohols, ethers and esters and mixtures thereof, all having a boiling point lower than the softening point of the thermoplastic resin.

7. A method according to claim 6 wherein the halogenated hydrocarbon is trichloromonofluoroethane.

8. A method according to claim 1 wherein the volatile foaming agent is used in an amount of 6 to 15 parts by weight based on 100 parts by weight of the thermoplastic resin.

9. A method according to claim 1 wherein a material selected from the group consisting of calcium carbonate, clay, talc, zinc white, silicate, glass powders, carbon black and wooden powders is used as a nucleating agent.

10. A method according to claim 1 wherein said mixture is extruded in the form of any of a rod, pipe and board.

11. A method according to claim 1 wherein said extruded mixture is expanded to a thickness of 10 to 200 mm.

12. A method according to claim 1 wherein the thermoplastic resin is incorporated with an additive selected from the group consisting of a pigment, antioxidant, ultraviolet absorber and flame retardant.

13. A method of manufacturing a tough thermoplastic resin foam having a low density and large cell size which comprises
   a. introducing into an extruder a thermoplastic resin, 2 to 20 parts by weight of a volatile foaming agent based on 100 parts by weight of said resin and soluble in said resin at extruding temperature and less than 3 parts by weight of a nucleating agent based on 100 parts by weight of said resin,
   b. extruding into the atmosphere the mixture in the form of a board through a die orifice at a temperature between the softening or melting point of said mixture and a temperature 20°C higher than the softening or melting point of the thermoplastic resin itself,
   c. cooling the surfaces of the board rapidly by blowing cooled gas, spraying liquid, placing the board in contact with a cooled metal material or fixing a cooling sheet-like material to form skin layers on both sides thereof, and
   d. cooling the board with skin layers slowly to cause the formation of foam nuclei therein and to make cells grow more than 5 mm in average cell diameter by permitting the extruded mixture to stand in the open air or placing it in a heat transfer medium, while taking up the board at a speed less than the extrusion speed at the die orifice.

14. A method according to claim 13 wherein said slow cooling is carried out at such a rate that the growth of cells is completed in 2 to 25 minutes after the extrusion of said board.

15. A method of manufacturing a board formed of tough thermoplastic resin foam surfaced on both sides thereof with hard skin layers about 1 mm thick, more than 50 percent of cells of the resin foam having a diameter of more than 5 mm, the thickness of the board being between about 10 to 200 mm and the density of the board being between about 0.05 to 0.3 g./cc., which comprises:
   a. Introducing into an extruder a thermoplastic resin, 2 to 20 parts of a volatile foaming agent based on 100 parts of said resin and soluble in said resin at extruding temperature and less than 3 parts by weight of a nucleating agent based on 100 parts by weight of said resin, b. extruding into the atmosphere the mixture in the form of a board through a die orifice at a temperature between the softening or melting point of said mixture and a temperature 20°C higher than the softening or melting point of said thermoplastic resin, c. cooling the surfaces of the board rapidly by blowing cooled gas, spraying liquid, placing the board in contact with a cooled metal material or fixing a cooling sheet-like material to form skin layers on both sides therof, and d. cooling the board with skin layers slowly to cause the formation of foam nuclei therein and to make cells grow more than 5 mm in average cell diameter by permitting the extruded mixture to stand in the open air or placing it in a heat transfer medium, while taking up the board at a speed less than the extrusion speed at the die orifice.

* * * * *